April 21, 1936.  W. H. ALEXANDER  2,038,156
TRAILER HITCH AND SUPPORT.
Filed Dec. 4, 1935  2 Sheets-Sheet 1
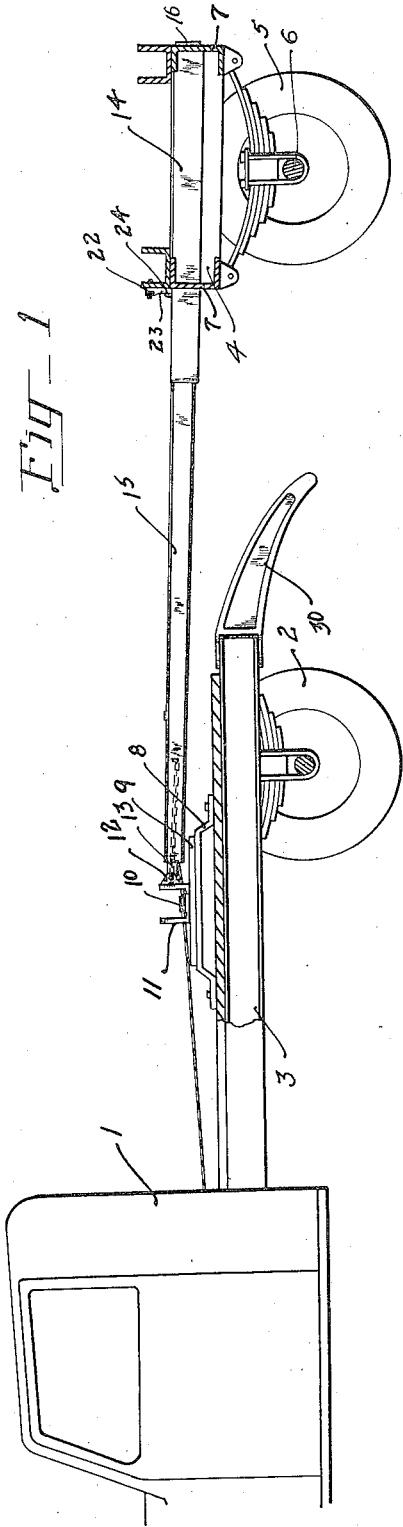
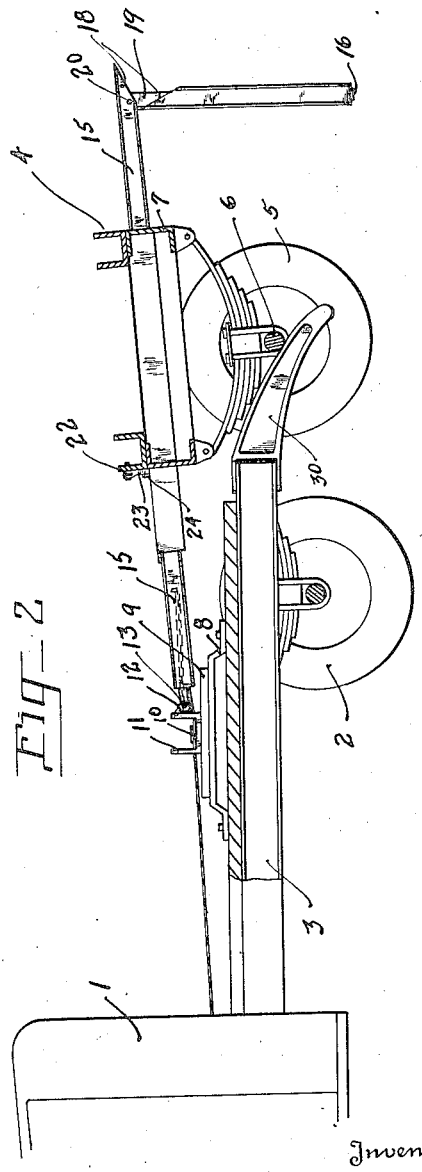
Inventor
WILLIAM H. ALEXANDER
By
Attorney April 21, 1936.  W. H. ALEXANDER  2,038,156
TRAILER HITCH AND SUPPORT
Filed Dec. 4, 1935   2 Sheets-Sheet 2
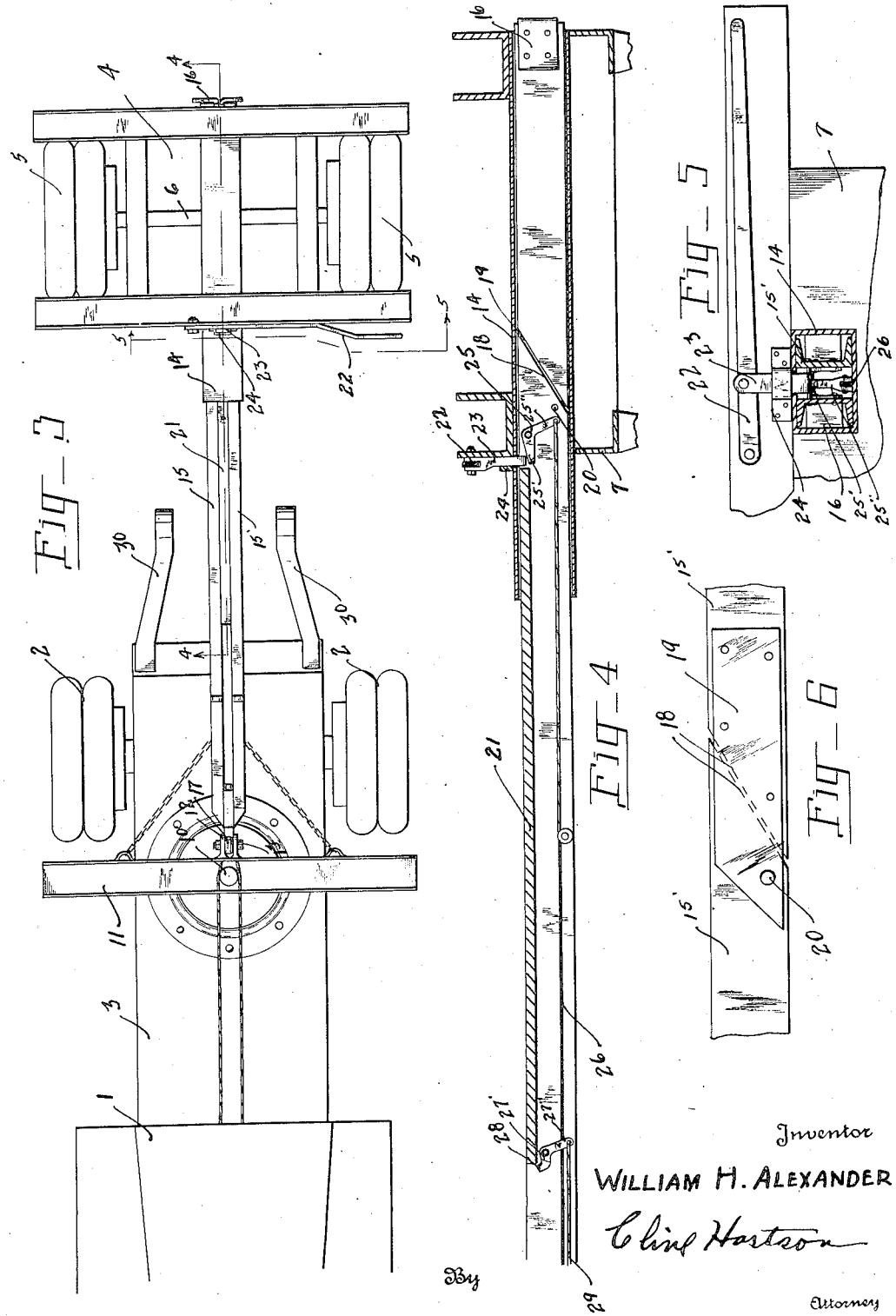
Inventor
WILLIAM H. ALEXANDER
By Cline Hartson
Attorney Patented Apr. 21, 1936

2,038,156

UNITED STATES PATENT OFFICE 2,038,156

TRAILER HITCH AND SUPPORT

William H. Alexander, Klamath Falls, Oreg.

Application December 4, 1935, Serial No. 52,800

4 Claims. (Cl. 214—65)

My invention relates to trailers employed in connection with trucks for hauling timbers, logs, poles, beams and the like and concerns itself with a hitch and support structure the operation of which permits the trailer to be carried by the truck during the periods no loads are being carried.

One object of the invention resides in the hitch which includes a reach connecting the trailer to the truck. The improvement resides in a sliding connection between trailer and reach whereby the trailer can be moved toward the truck and be mounted and carried upon a support therefor extending from the frame of the truck.

Another object of the invention is to provide coupling means between the reach and trailer holding it securely to such reach regardless whether it is being trailed or carried by the truck.

Another object of the invention is to provide a reach which may be folded when the trailer is being carried thereby preventing the rear end of the reach projecting dangerously from the truck and trailer.

These and other objects of the invention will be ascertained from the following specification and accompanying drawings, wherein—

Figure 1 is a side elevation of the rear end of a truck and a trailer connected thereto. In this view the trailer is in trailing position.

Figure 2 is the same as Figure 1 with the exception that the trailer is in a position wherein it is supported and carried by the truck.

Figure 3 is a plan of the view shown in Figure 1.

Figure 4 is the section view shown by the lines 4—4 in Figure 3. This view shows the sliding connection between trailer and reach, and also the coupling and other means for securing the trailer against movement relative to the reach.

Figure 5 is the section view indicated by the section line 5—5 in Figure 3. This view shows a manual means for releasing the rear coupling member.

Figure 6 is a fragmentary side elevation of the reach showing a knuckle in the reach which permits it being folded when the trailer is being carried by the truck.

In the drawings, 1 indicates truck provided with wheels 2, and frame 3, and 4 indicates a trailer supplied with wheels 5, supporting axle 6 and a frame 7 supported upon such axle. Mounted upon the frame 3 is a head 8 to which is swivelly mounted a plate 9 by means of a pin 10. A bolster 11 is mounted to the plate, and projecting from its rearward midsection are a pair of spaced ears 12 through which is passed and secured a bolt 13.

Extending longitudinally of the frame 7 of trailer 4 is a four sided member having an interior space or passage constituting a reach seat and indicated in its entirety by the numeral 14. A reach 15 is slidably mounted within the seat, and its forward end is provided with an eye 17 through which is passed the bolt 13. The rear end of the reach terminates in the flange members 16 which project laterally a sufficient distance to engage the end of the seat 14 and the rear of trailer frame 7 to prevent the rear end of the reach from sliding from the seat 14, thus compelling the trailer to travel with the reach when the reach is drawn by the truck 1.

Reach 15 is composed of two channel members 15' placed parallel one another. Intermediate their ends the members 15' are cut diagonally as indicated by the dotted line 18 in Figure 6 and the diagonal ends 18 in Figure 2. Secured to the inner faces of the channels are the plates 19. These are firmly attached to the rearward sections of the channels and are pivotally connected to the forward channel sections by means of the pin 20. The plates 19 and pin 20 serve as a hinge securing the rearward sections to the forward sections. The inclination of the ends 18 prevent the rear sections being pivoted above the forward sections. Secured between the two channel members and secured to the upper flanges of each is a plate 21.

On the forward end of the trailer 4 is pivotally mounted a lever 22 to which is pivoted a latch lug 23 which operates within the guide 24. Lug 23 serves to hold the trailer against movement relative to the reach 15, as will be hereafter explained. Mounted to the rear of the truck 1 are a pair of downwardly inclined arms 30 constituting trailer supports. These supports are directed toward each other somewhat in order to fit between wheels 5 of such trailer. Rearwardly of plate 21 and to one of the channels 15 is pivotally mounted a bell lever 25 having arms 25' and 25''. A cable connects to arm 25'' and leads to the driver's seat of truck 1. A second bell lever 27 is mounted adjacent the forward end of the plate. This lever has two arms 27' and 27'' respectively. Arm 27' has an upwardly projecting boss 28. Connected to arm 27'' is a cable 29 which leads to the driving seat of truck 1. The purpose of levers 25 and 27 and associated elements will be explained as the description progresses.

Figure 1 shows the trailer in trailing position wherein it travels upon its wheels 5, while in Figure 2 the trailer is shown being carried upon arms 30. The first position is the operating position wherein trailer and truck are in position to jointly carry a load, whereas in the second position the trailer is being carried between loads which permits greater road speeds without danger of side sway to passing vehicles. When the trailer is in the first position lever 22 is lowered thus depressing latch 23. Latch 23 engages the rearward end of plate 21 and consequently prevents the trailer moving forward upon reach 15. Thus the trailer is held stationary relative to the reach between latch which engages rearward end of plate 21 and the flange 16 which its rearward end engages. However after the load has been disposed of, the trailer may be moved forward upon the reach to a position upon the supports 30. This can be easily done by blocking wheels 5 of the trailer and backing the truck, or a cable may be attached to the trailer and it be moved forward thereby. However before this can be done, the latch 23 must be released, which is done by operating the bell lever 25 through the medium of cable 26 thus lifting arm 25' and thereby lifting latch 23 free of the rearward end of plate 21. When the trailer is being supported by the truck the axle 6 rests upon the supports 30. When the trailer is in such supported position, lever 22 is lowered thus lowering latch 23 which engages the forward end of plate 21 thus securing the trailer against rearward movement from the supports 30 and relative to the reach 15. When the trailer is to be removed from the supports the lever 27 is manipulated through the medium of cable 29 to raise arm 27' upwardly and cause boss 28 to push latch 23 out of engagement with the forward end of plate 21. When the trailer is in supported position the rear end of reach folds downwardly, as shown in Figure 2, upon the hinge 19 thus eliminating a dangerous projecting member at the rear of the truck.

While a specific form of the improvement has been described and illustrated herein, it is desired to be understood that the same may be varied, within the scope of the appended claims, without departing from the spirit of the invention.

Having described my invention, I claim—

1. A trailer and support in combination with a truck and a trailer, means for supporting the trailer by the truck, a reach connected to the truck, a connection between trailer and reach whereby the trailer can be moved relative thereto from a trailing position to a position wherein it is supported by the truck or vice versa, a latch carried by the trailer and latch seats in the reach cooperating to secure the trailer in either position, and a knuckle joint in the reach for folding its rearward end when the trailer is in supported position.

2. A trailer hitch and support in combination with a truck, a trailer, and means for supporting the trailer by the truck, comprising a reach having its forward end swivelly mounted upon the truck and slidably connected to the trailer, said reach having a forward and rearward latch seat, a latch operably mounted to the trailer including means for causing the latch to seat in one or the other of said seats according to whether the trailer is in trailing position or supported by the truck, and means adjacent each seat for unseating the latch therefrom.

3. A trailer hitch and support in combination with a truck, a trailer, and means for supporting the trailer by the truck, comprising a reach having its forward end swivelly mounted upon the truck and having a slidable connection with the trailer whereby the trailer can be moved relative to the reach from trailing position to a position wherein it is carried by the truck and vice versa, said reach having a forward and a rearward latch seat, latch operating means mounted upon the trailer, a latch operated thereby and engageable with one or the other of the seats to secure the trailer in one or the other of said positions, and members adjacent each seat operable to disengage the latch therefrom.

4. A trailer hitch and support in combination with a truck, a trailer and means for supporting the trailer by the truck, comprising a reach having its forward end swivelly mounted upon the truck and having a slidable connection with the trailer whereby the trailer can be moved relative to the reach from trailing position to a position wherein it is carried by the truck and vice versa, a member secured to the reach providing a forward and rearward latch seat, latch operating means mounted upon the trailer, a latch operated thereby seatable in one or the other of said seats to secure the trailer in one or the other of said positions, and members mounted adjacent each seat operable to unseat the latch.

WILLIAM H. ALEXANDER.